United States Patent [19]
Blatherwick

[11] 3,740,138
[45] June 19, 1973

[54] PROCESS CAMERA ALIGNMENT AND EXPOSURE SYSTEM

[75] Inventor: Delbert T. Blatherwick, Arcadia, Calif.

[73] Assignee: Acti Products, Inc., Arcadia, Calif.

[22] Filed: Mar. 8, 1971

[21] Appl. No.: 121,780

[52] U.S. Cl. .................................... 355/73, 95/49
[51] Int. Cl. ........................................... G03b 27/60
[58] Field of Search .................... 95/49; 355/72, 73

[56] References Cited
UNITED STATES PATENTS
1,813,690  7/1931  Weisker ............................ 355/73 X
2,645,153  7/1953  Halpern ............................. 355/73

Primary Examiner—John M. Horan
Attorney—Smyth, Roston & Pavitt

[57] ABSTRACT

A process camera having a tiltable frame upon one face of which a ground glass viewing assembly is mounted and upon the opposite face of which a vacuum platen is mounted. The tilt of the frame is controlled by a pair of arms acting against a set of bearing guides so that either the ground glass or vacuum platen may be selectively positioned at the camera optical system image plane.

11 Claims, 6 Drawing Figures

Patented June 19, 1973
3,740,138
3 Sheets-Sheet 1
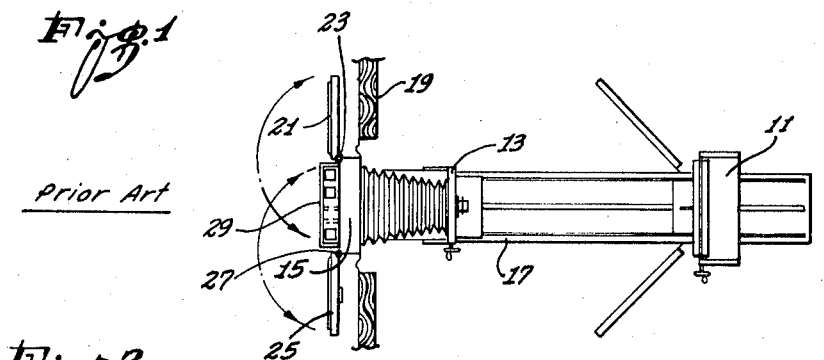
Fig.1  Prior Art
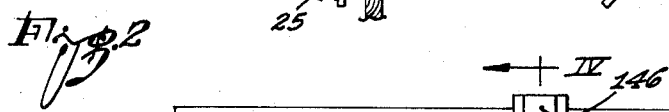
Fig.2
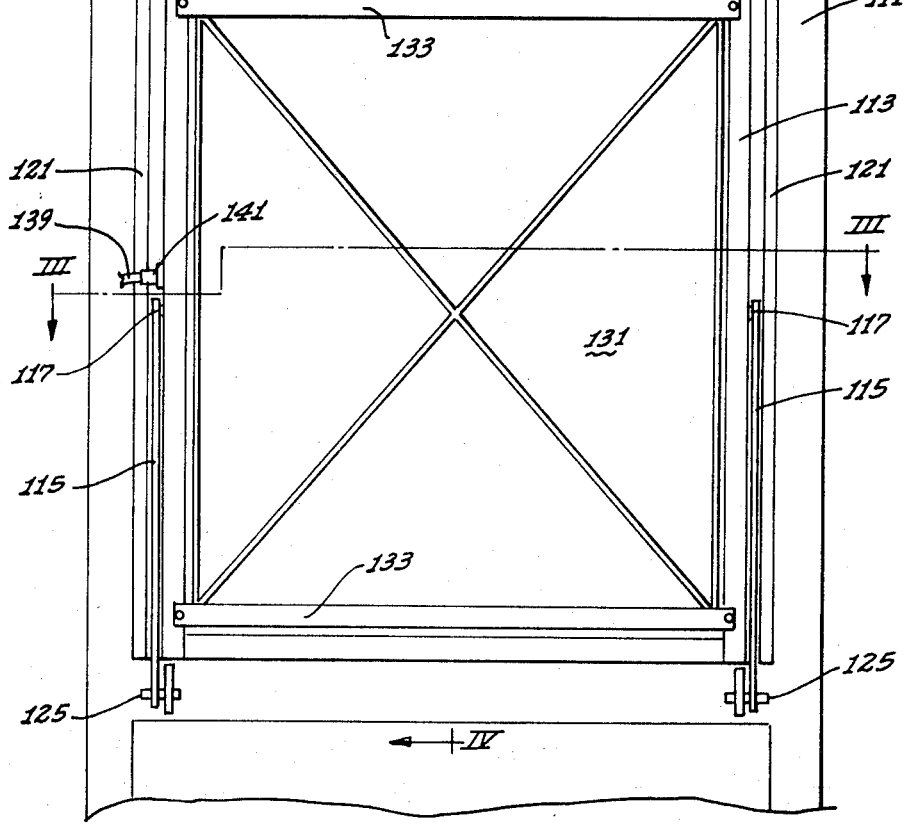
INVENTOR:
Delbert T. Blatherwick
By Smyth, Roston & Pavitt
ATTORNEYS Patented June 19, 1973
3,740,138
3 Sheets-Sheet 2
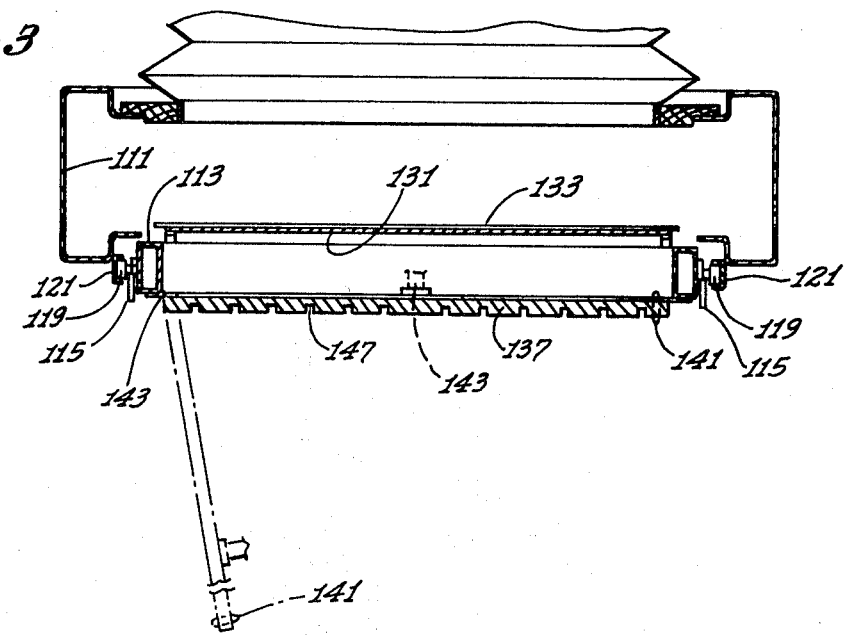
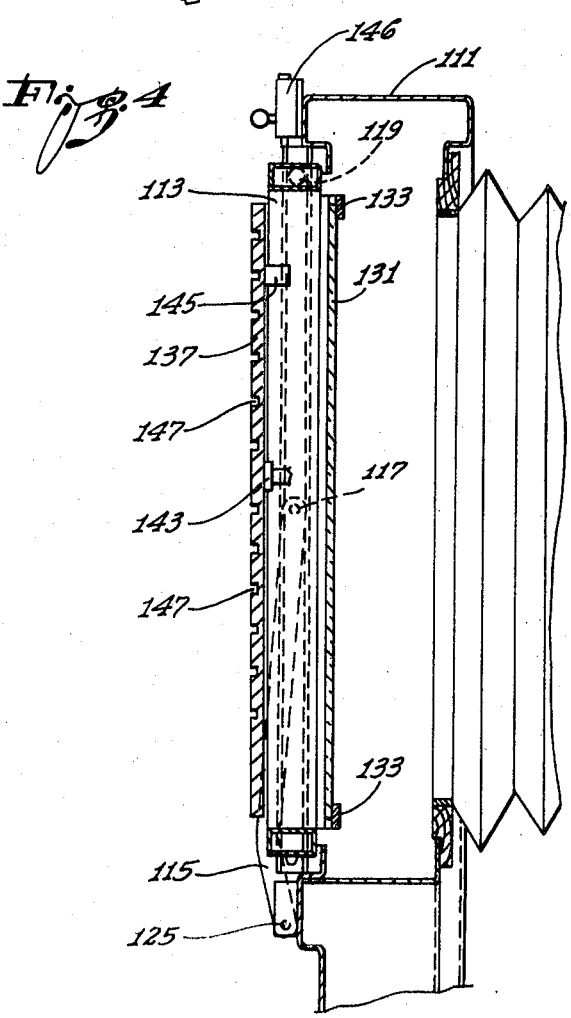
INVENTOR:
Delbert T. Blatherwick
ATTORNEYS

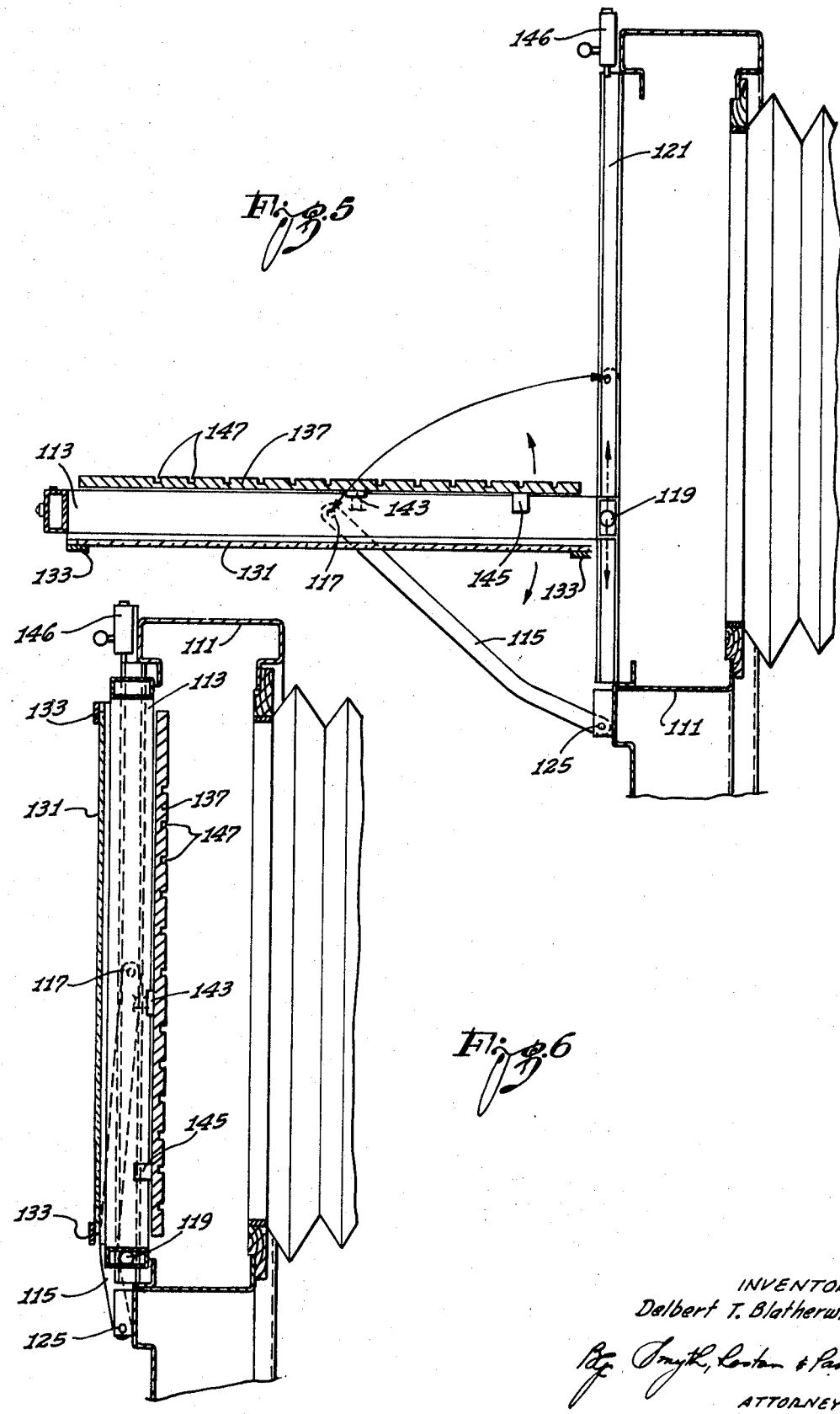

PROCESS CAMERA ALIGNMENT AND EXPOSURE SYSTEM

BACKGROUND OF THE INVENTION

When photographs and other materials are to be reproduced for use in manufacturing printing plates, etc., it is common to manufacture these reproductions through photo-mechanical methods involving process cameras. In such cameras, at least two of three main elements, the film holder, the lens, and the subject holder, are movable relative to the other elements so that the scale or size of the reproduction may be accurately controlled. In some available machines, the film holder is fixed in position and the lens and object holder are movable relative thereto and to one another to accomplish this result.

When a photographer has positioned the object holder and the lens, his usual practice is to position a ground glass viewing screen in the plane of the image projected by the camera lens which he then observes to ensure proper centering, size, and sharpness of the image prior to the time that sensitized material, such as film, etc., is exposed.

When the photographer has accomplished this step, he must then remove the ground glass viewing screen and accurately position the sensitized material in the image plane. In order to position and retain the sensitized material in the lens image plane, it has become common practice to provide a vacuum platen upon which the material can be accurately positioned and then held in place by means of a vacuum. This is sometimes difficult to do quickly since the operator must accurately locate the material in a vertical plane against the platen and then retain it there with one hand while actuating the vacuum with the other. The platen is then moved so that the material is in the image plane so that it may be properly exposed by operation of the lens shutter.

Obviously, the ground glass viewing screen and the vacuum platen must be very accurately positioned and repositioned in the optical image plane to accomplish the highly accurate reproduction work required.

In the prior art for such cameras, one of the more popular technique for accomplishing these actions has been to position the ground glass viewing screen and the vacuum platen in separate frames, each of which is pivotable upon main supporting structure on the rear case of the lens unit. When the screen and the platen are not in use, they are stored at opposite sides of the rear case by pivoting them in a horizontal plane to a position approximately 180° from their operating locations.

While the structural arrangement is simple and relatively reliable, it must be borne in mind that the rear case of the lens unit normally opens into a darkroom in which only minimum space has been allotted. Since each of the elements opens or pivots in the opposite direction, the operating clearance required for the prior art arrangement is approximately three times the width of the camera. In other words, a large amount of space must be set aside both at the storage position and in the arc through which each element moves to accommodate cameras of this type. Since space is limited anyway, and numerous other pieces of equipment must be located in the dark room, it is very difficult to provide proper darkroom layout and the room is either very crowded or unnecessarily large.

Many attempts have been made to solve these problems, but unfortunately most of them have proven to be equally as undesirable. For example, some cameras have been manufactured which require that the viewing screen and the platen be selectively attached and detached from the rear case as they are used. These cameras have proven to be unacceptable due to the problems inherent in physically lifting and attaching the elements and storing them in some place when they are not in use in which they will not be damaged or broken. Further, due to manufacturing and wear tolerances, the accuracy required in positioning the elements is relatively low. Another attempt at solving the problem has resulted in the pivoting of the viewing screen and the platen in a vertical plane relative to the rear case, about hinges positioned at the top and bottom of the rear case. In other words, the viewing screen could be raised above the camera and the vacuum platen lowered below the camera when they are in their storage positions. In this design, each of the elements must be provided with a counterbalancing system which becomes rather intricate and unreliable for the larger process cameras. Further, as the cameras become larger, thereby requiring larger viewing screens and vacuum platens, the storage space required above and below the rear case is similarly increased. In such cameras, when the vacuum platen is lowered into its storage position it covers the camera operating controls and other hardware which are normally located in that area, making them inaccessible to the photographer unless the platen is positioned in the image plane.

Various other designs have been tried, including combinations of the above described designs and also including such designs as those in which the viewing screen and platen are movable in vertical planes relative to the camera, similarly to the vertical movement by which a window is opened and closed. In all of these systems, the space required for storage has proven to be undesirably large and the proper positioning of the elements in the image plane has required cumbersome and intricate positioning structures.

Thus it has become desirable to design a process camera imaging system in which the viewing screen and platen may be easily and accurately positioned in the optical image plane and properly stored in a position to which it may be moved with a minimum of movement so that a minimum of space is required to accomplish that movement.

SUMMARY OF THE INVENTION

The present invention relates to an optical imaging system for a process camera which achieves the above-stated desired results. More particularly, the invention relates to an imaging system which may be used with a process camera having a ground glass viewing screen and vacuum platen mounted on a carrier frame. The carrier frame may be pivoted relative to the rear case of the camera for selective usage of one element or the other.

More particularly, the ground glass viewing screen and vacuum platen may be mounted in a carrier frame attached to main support structure on the rear case. The main support structure may include a pair of control arms attached to the carrier frame at predetermined positions such that the carrier frame will seek one of three equilibrium positions as it is being pivoted by the photographer. A pair of guide bearings, for example, may be attached adjacent one end of the carrier frame so that movement of that end of the carrier frame may be controlled by vertical guide channels on the main supporting structure.

In two of the three equilibrium positions sought by the carrier frame, either the ground glass viewing screen or the vacuum platen may be properly and accurately positioned within the optical image plane. In the third equilibrium position, the vacuum platen may be held at a substantially horizontal position which is intermediate the other two equilibrium positions, thereby allowing the photographer to accurately locate and position the sensitized material against the vacuum platen prior to the time that the vacuum is generated within the platen. Thus, there will be little likelihood of movement of the material between the time it is positioned and the time the vacuum is applied. With structure of this type, the speed and accuracy of the positioning of the elements is increased since the photographer must manipulate only one frame, rather than two, as in the prior art cameras. Further, a minimum space is required to operate such a camera since the only space required is that necessary for allowing the carrier frame to pivot in a vertical plane immediately behind the rear case of the lens structure. Therefore, other equipment may be positioned immediately adjacent the camera at either side thereof. The operating controls are readily accessible to the photographer at all times during the set-up and operation of the camera.

Further objects, advantages, modes, and embodiments of the present invention will be realized by those skilled in the art upon perusal of the detailed description, taken together with the accompanying drawings, which illustrate what is presently considered to be a preferred embodiment of the best mode contemplated for utilizing the novel principles of the invention. It will also be realized that the following description merely illustrates a single embodiment of the invention and is not intended to limit or define its scope, since that function resides solely in the appended claims.

BRIEF DESCRIPTION OF THE DRAWINGS

FIG. 1 is a top plan view of a camera utilized in the prior art;

FIG. 2 is a rear view of a camera manufactured in accordance with the present invention;

FIG. 3 is a partial sectional view of the camera shown in FIG. 2, taken along a line III—III therein;

FIG. 4 is a vertical sectional view of the camera shown in FIG. 2, taken along a line IV—IV therein, and illustrating the carrier frame in one equilibrium position thereof;

FIG. 5 is a view similar to FIG. 4, illustrating the carrier frame in a second, intermediate, equilibrium position; and FIG. 6 is a view of the camera similar to FIGS. 4 and 5, showing the carrier frame in the third, material exposure, equilibrium position.

DETAILED DESCRIPTION

Referring now to FIG. 1, there is shown a prior art type of process camera comprising an object holder 11, a lens system 13, and a rear case 15. The object holder 11 and lens system 13 are movable relative to one another and to the rear case along a track 17. Suitable means (not shown) are provided on each of the movable members for accurate positioning thereof along the track.

The rear case 15 is usually positioned within a darkroom, as indicated schematically by the partial wall 19.

In the more commonly available machines of the prior art, a ground glass viewing screen 21 is pivotally mounted on the rear case 15 at a hinge 23 and a vacuum platen 25 is pivotally mounted on the case at a hinge 27. A control panel 29 is positioned beneath the lower end of the rear case so that the photographer can properly operate the camera.

In use, the photographer will properly locate the object holder 11 and the lens system 13 to produce a desired image within a material exposure plane in the rear case. In order to ensure that the image is of proper size and sharpness and is properly centered, the photographer will swing the glass screen 21 into position against the rear of case 15 and over the control panel 29 so that he can view the image on the glass and ensure that the desired image quality is present. When he has accomplished this, he swings the screen 21 back to the position shown in the drawing and properly locates sensitized material such as film, against the vertical surface of the vacuum platen 25 by aligning it with specific markings on the face of the platen. He then causes a vacuum to be generated within the platen which holds the material against the face of the latter. Next, he pivots the platen into position against the rear case over the control panel, locks it in place, and opens the shutter in the lens system 13 for a predetermined length of time, exposing the sensitized material.

When the material is exposed, the photographer unlocks the platen from the rear case, swings it to the position illustrated in FIG. 1, releases the vacuum, and removes the exposed material so that it can be properly developed.

A review of the illustration of FIG. 1 will reveal that the space required within the darkroom to accommodate such a process camera is approximately three times the width of the camera in order to allow for suitable storage of the ground glass viewing screen 21 and the vacuum platen 25 in the positions shown. When it is realized that these cameras are often two to three feet wide, it will be understood that, in some cases, a nine foot width must be provided to accommodate each such camera. Therefore, either the darkroom must be relatively large to accommodate the camera or the amount of equipment which can be used in the darkroom is undesirably diminished.

A rear case 111 of a camera formed in accordance with the present invention has been shown in FIGS. 2-6. A pivotable frame 113 may be mounted within the rear case on a pair of support arms 115 to which the frame is pivoted at bushings 117. A pair of frame guide bearings 119 (FIG. 3) may be suitably mounted on one end of the frame 113 and controlled in vertical movement by guide channels 121 fixed to the rear case 111.

The lower ends of the support arms 115 may be journaled to the rear case, for example, at pivots 125 so as to support the rotary frame 113 in all of the positions which it may assume.

A ground glass viewing screen 131 may be mounted in the rotary frame 113 by any suitable means such as cross bars 133 at the top and bottom thereof. Although not shown in the drawing, suitable markings may be etched into the glass 131 so that when the photographer views the image which is projected onto the glass by the lens system, he can ascertain whether or not it is optically centered, clear, etc.

A vacuum platen 137 may be suitably attached to the frame 113 and provided with a plurality of very narrow grooves 147 which serve to hold a sensitized workpiece, such as film, etc., against the face of the platen for exposure thereof. In order to create a vacuum at the surface of the platen, a hose 139, connected to a suitable vacuum source (not shown) may be positioned so as to pass through a bushing 141 in the side of the rotary frame 113 to provide communication between the vacuum source and a manifold 143 which is positioned on the inside of the vacuum platen near the center thereof. The vacuum is then transferred by the innermost grooves 147 to a sliding block valve 145 which may be moved by the photographer to a large number of working positions so that the vacuum may be distributed to grooves 147 in the outer face of the platen. These grooves can be formed at predetermined locations in accordance with standard film sizes so that the film may be positioned over the grooves and the block valve moved to a position which causes all of the grooves under the film to be under vacuum, with those grooves beyond the periphery of the film shut off from communication with the vacuum source.

The structure of the vacuum system has been described and illustrated here only in general terms since it does not, per se, form a part of the invention claimed here and any suitable vacuum system may be used to hold the film in position.

In use, the operator may locate the rotary frame 113 in the position shown in FIGS. 3 and 4. He may then releases a lock assembly 141 located at one side of the vacuum platen and pivot the platen to the position shown in phantom in FIG. 3 about a vertical hinge 143. He may then look through the frame 113 and see the image projected onto the ground glass viewing screen 131 so that its various qualities can be checked and controlled. When the operator has completed checking the image and is sure that it is properly located on the viewing screen, in focus, etc., he may swing the platen to the closed position so that the lock assembly 141 once again holds it in the solid-line position illustrated in FIG. 3.

When that action has been completed, the operator may release a lock 146 which, if desired, may be used to lock the frame in the position of FIG. 4. Since the frame is in a position of equilibrium in that location, the operator may pull outwardly on the bottom of the frame, causing the top to fall under the guidance of the rollers 119 in the guide channels 121 until the frame reaches the position illustrated in FIG. 5. Proper selection of the design geometry will cause the frame to also be in equilibrium in that location so that the operator can let go of it and manipulate a sensitized material into a proper position on the vacuum platen 137 in accordance with location markings positioned on the platen. When he has accomplished this, the operator may actuate the vacuum, in the manner previously described, so that the sensitized material can be firmly held against the platen.

The operator may then exert an upwardly directed force on the outer ends of the frame 113, causing the end of the frame upon which the bearings 119 are mounted to move to the bottoms of the channels 121 so that the rotary frame attains the position illustrated in FIG. 6, in which it is once again in the equilibrium.

In order to ensure that the frame and the sensitized material do not move relative to the camera, the lock 145 may again be actuated to hold the frame in the exposure position. The surface of the vacuum platen is now located in the image plane in which the ground glass viewing screen had been previously located and the operator, by operating the shutter in the lens system, can expose the sensitized material located on the platen.

After the material has been exposed, the operator may return the frame 113 to the position of FIG. 5, release the vacuum, and remove the material so that it may be properly developed. In order that the photographer may move freely within the darkroom, he can lift the outer end of the frame 113 once again, causing it to be locked in position by the lock 146.

Thus, the applicant has provided a new and improved process camera which allows the desired focusing and exposure of a properly located negative in a relatively short period of time, with a minimum of movement by the photographer, and without requiring the allowance of space wider than the physical width of the camera for operation and storage of the elements thereof. Thus, the invention yields a true advance in the art, a single embodiment of which has been illustrated and described above. Many modifications and alterations of the above embodiment as well as other embodiments, will now be realized by those skilled in the art without exceeding the scope of the invention as defined in the claims hereof.

What is claimed as the invention is:

1. In a process camera,
    a rear case,
    an exposure unit mounted on said rear case including
        a frame member having
            a viewing screen on one side thereof and
            a photosensitive material holding platen on the opposite side of said frame member and movable relative thereto so as to allow said viewing screen to be observed through said frame member, and
        means for pivotally supporting said frame member in a plurality of positions relative to said rear case to position either said viewing screen or said holding platen in an image plane of said camera.

2. In a process camera,
    a rear case,
    an exposure unit mounted on said rear case including
        a frame member having
            a viewing screen on one side thereof and
            a photosensitized material holding platen on the opposite side thereof, and
        means for pivotally supporting said frame member in a plurality of positions relative to said rear case to position either said viewing screen or said holding platen in an image plane of said camera including
            means for supporting said frame member in a material-locating position intermediate the positions in which either said viewing screen or said holding platen are supported in an image plane of said camera.

3. In a process camera,
    a rear case,
    an exposure unit mounted on said rear case including
        a frame member having
            a viewing screen on one side thereof and a photosensitized material holding platen on the opposite side thereof, and means for pivotally supporting said frame member in a plurality of positions relative to said rear case to position either said viewing screen or said holding platen in an image plane of said camera comprising a pair of arms pivotally attached to said rear case and to said frame member and located relative to each so that said frame member may attain three positions of pivotal equilibrium: (1) when said viewing screen is in the image plane; (2) when said holding platen is in the image plane; and (3) when said holding platen is located in a plane which is substantially perpendicular to the image plane.

4. A process camera including a rear case, an exposure frame mounted on said rear case and having a viewing screen, a holding platen, and means for movably mounting said holding platen relative to said exposure frame to allow the sighting of an image on said viewing screen, from the rear of said viewing screen, when the latter is in the image plane of said camera, and means for supporting said exposure frame in at least two positions of equilibrium whereby said viewing screen may be selectively located in an image plane of the camera or said holding platen may be located in the image plane of the camera.

5. The process camera of claim 4 including vacuum means in said holding platen for selectively and accurately locating a photosensitive material thereon.

6. A process camera including a rear case, an exposure frame mounted on said rear case having a viewing screen and a holding platen, and means for supporting said exposure frame in at least two positions of equilibrium whereby said viewing screen may be selectively located in an image plane of the camera or said holding platen may be located in the image plane of the camera including means for pivotally mounting said frame relative to said rear case for rotation thereof about a vertical axis and means for limiting the motion of a portion of said frame to that defined by a plane which is substantially parallel to the camera image plane.

7. A process camera comprising a rear case defining an image plane of the camera, an exposure frame pivotally mounted on said rear case including an image viewing screen on one side thereof which may be positioned in said image plane to ascertain the quality of the image, a photosensitive material holding platen on the other side thereof which may be positioned in said image plane to expose photosensitive material located thereon, means pivotally mounting said holding platen relative to said exposure frame so that said holding platen may be positioned relative thereto to allow viewing of the image on said viewing screen from the rear thereof, and means for distributing a vacuum force to selective positions on said holding platen to accurately affix a photosensitive material thereto, and means for pivotally mounting said exposure frame on said rear case to provide a plurality of positions of pivotal equilibrium of said exposure frame relative thereto.

8. The process camera of claim 7 wherein said exposure frame has a first pivotal equilibrium position in which said viewing screen is located in said image plane and a second pivotal equilibrium position in which said holding platen is located in said image plane.

9. The process camera of claim 8 wherein said exposure frame has a third pivotal equilibrium position in which said holding platen is located in a position which is convenient for the accurate positioning of a photosensitive material thereon.

10. The camera of claim 4 wherein said mounting means includes releasable latch means for fixing said holding platen in place relative to said exposure frame while allowing an operator to move said platen relative to said frame when said viewing screen is in the camera image plane.

11. The camera of claim 4 wherein said holding platen includes vacuum means for holding a photosensitized workpiece thereto and means for adjusting the area of said platen across which the force of said vacuum means is exerted.

* * * * *